United States Patent [19]

Baumann

[11] 4,214,730

[45] Jul. 29, 1980

[54] CHEMICALLY INERT CONTROL VALVE

[76] Inventor: Hans D. Baumann, 35 Mirana Rd., Portsmouth, N.H. 03801

[21] Appl. No.: 29,147

[22] Filed: Apr. 11, 1979

[51] Int. Cl.³ .......................... F16K 1/52; F16K 47/04
[52] U.S. Cl. .................................... 251/171; 251/205; 251/362; 251/214
[58] Field of Search ............... 251/205, 189, 187, 171, 251/362, 214

[56] References Cited

U.S. PATENT DOCUMENTS

| 2,856,961 | 10/1958 | Kruschik | 251/362 X |
| 3,010,695 | 11/1961 | Banks | 251/205 |
| 3,240,230 | 3/1966 | Callahan, Jr. et al. | 251/205 X |
| 3,997,141 | 12/1976 | Baumann | 251/205 |

Primary Examiner—Arnold Rosenthal

[57] ABSTRACT

A control valve, the internal wetted working parts of which are made of corrosion resistant material and which are completely enclosed by and easily removable from a steel or stainless steel pressure vessel, and which is capable of tight shut-off and which is able to offer accurate control of minute flowing quantities.

8 Claims, 2 Drawing Figures

CHEMICALLY INERT CONTROL VALVE

BACKGROUND OF THE INVENTION

This invention relates to a flow control or modulating valve commonly used in pilot plants, chemical process plants or paper mills. Such valves are usually positioned by pneumatic diaphragm actuators in response to a positioning signal from a control instrument of conventional art. The control of highly corrosive media used for the control of the PH level for bleaching paper for example, poses special problems for the process control engineer, since very few materials will resist the strong chemical attack by those media. Plastic materials, such as Teflon*, shown nearly perfect inertness, yet are not capable to serve as pressure vessels, i.e. to withstand the working pressure of the controlled medium nor the mechanical stress imposed by the connected piping. It has, therefore, been customary to clad inert valve parts with metal, i.e. to place all working parts of such a valve in a metal shell, usually Type 316 Stainless Steel.

*Tetrafluoroethylene

Prior art valves of this type have conventional plug and seat rings, both made from rigid Teflon. The conventional shape of such valves poses great difficulties on the metal cover design and the supporting metal cover or shroud is usually composed of several separate and interconnecting parts, in order to be able to properly support and protect the internal or wetted valve portion. Such relatively complicated arrangements are, therefore, neither safe nor economical to produce.

My invention has for an important object to provide for a chemically inert, or Teflon valve which is simple to insert into a one piece shroud or metal cover.

A further object is to provide a flangeless or wafer style valve which is easy to install in a pipe system and without need for additional pipe flange gaskets.

Furthermore, my invention allows to use a fluid pressure actuated valve seat which can be readjusted, if slightly worn, by external means and without need to remove the valve from service.

Finally, yet another objective of my invention is the ability to provide a valve capable of regulating even very minute amounts of flow without being affected by the limitations posed upon conventional Teflon valve plue-seat combinations, i.e. stickiness caused by thermal expansion or seizing due to interference fit of these identical material parts.

These and other objects, features, and advantages of the present invention will be understood from the following detailed description:

DESCRIPTION

Figure 2:
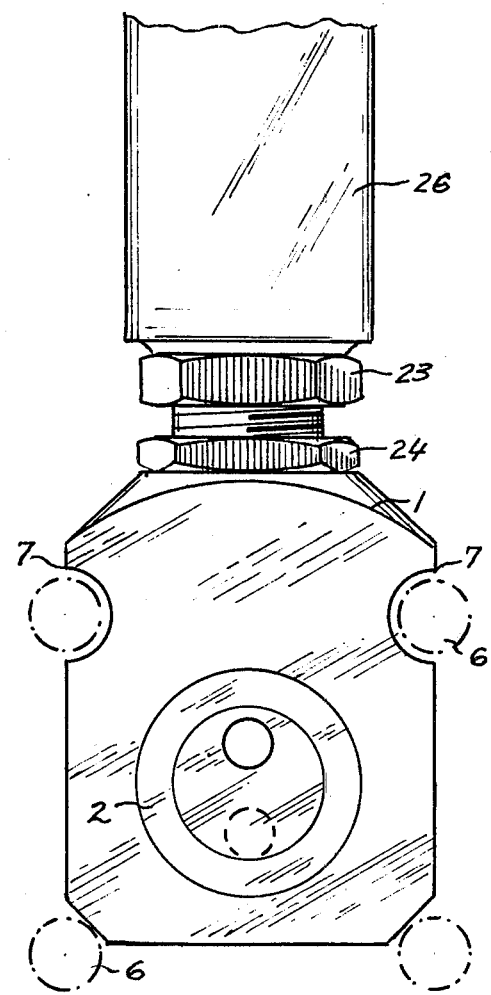
FIG. 2 is an end view of the invention shown in FIG. 1.

The subject invention comprises a metal valve housing 1, preferably made from corrosion resistant steel such as AISI Type 316. The housing serves as a retainer and pressure supporting frame for plastic insert 2 made from a chemically inert material such as Teflon. Note, that the insert 2, fitting tightly into a perpendicular bore 3 of housing 1, extends slightly above the width of housing 1 at either end portion 4, in order to serve as contact or gasket surface against adjacent line flanges 5 (shown here dashed) constituting parts of a piping system. Both flanges 5 are connected by conventional tie rods 6 which, when tightened, compress gasket surfaces 4 to form an effective seal to prevent fluid from leaving the pipe system, in addition to retaining housing 1 within the piping system. Guiding Slots 7 are provided within housing 1 for the tie rods 6 (shown in FIG. 2) to serve for centering housing 1 in relation to flanges 5.

Figure 1:
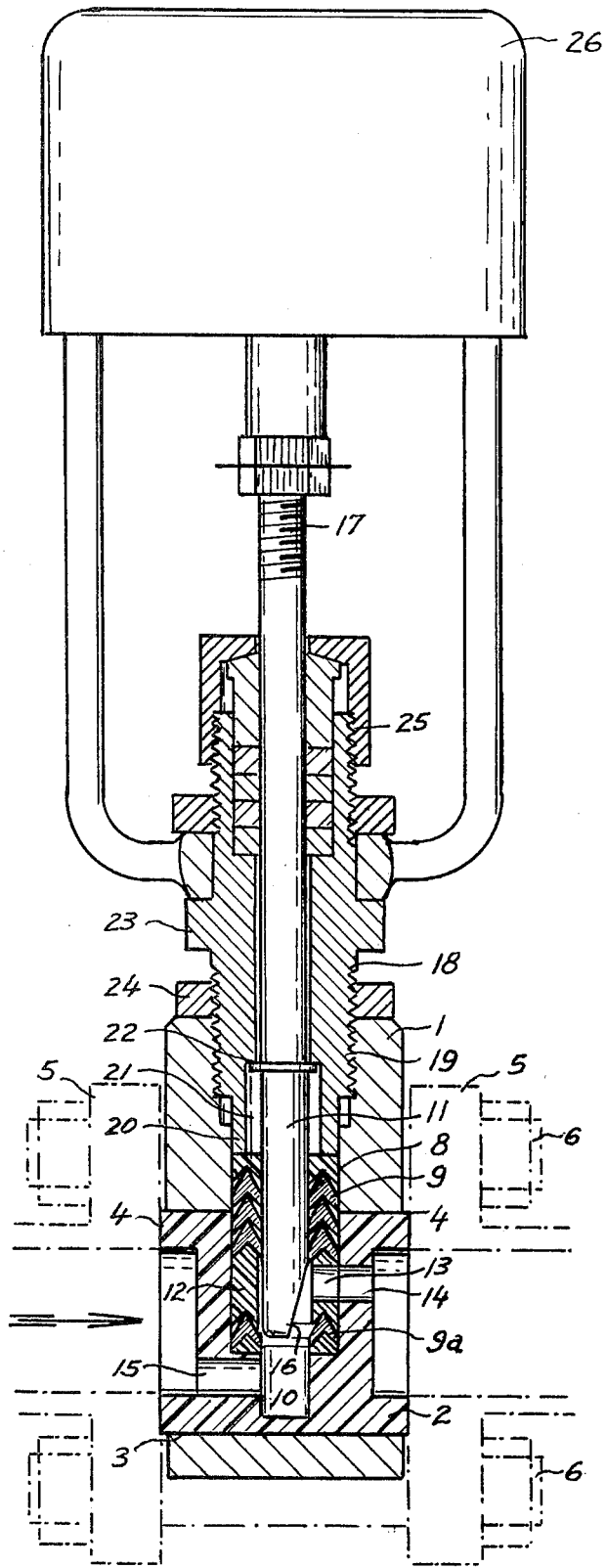
FIG. 1 is a vertical section of a preferred embodiment of the invention.

Referring back to FIG. 1, a vertical central bore 8 intersects both housing 1 and insert 2 to receive a number of stacked V-shaped packing rings 9, preferably made from Teflon and having a reduced diameter bore 10 which extends into the lower parts of insert 2 and which engages a sliding valve plug 11. Plug 11 is made of a highly corrosion resistant material such as Titanium or preferably Tantalum, not excluding materials such as glass or ceramics. The lowest one of packing rings 9A is separated from the rest by a tubular spacer 12 having a perpendicular cross-bore 13 which aligns a similar bore 14 in insert 2 to provide an outlet port for fluid passing the valve after entering an inlet port 15 located within the lower portion of insert 2 and connecting with reduced diameter bore 10. In the retracted plug position (as shown in FIG. 1), the fluid, after entering port 15 and bore 10 is able to pass by the outer perimeter 16 of plug 11, which is suitably shaped to control the fluid flow area for any given lift position of the plug before the fluid is exiting through port 14.

The fluid flow is stopped, whenever plug 11 is brought down by means of a suitable actuating device 26 of conventional art and through an interconnected valve stem 17, and when the fully cylindrical shape of plug 11 engages the lowest packing ring 9A which now serves in a function comparable to a valve seat in a conventional plug and orifice type valve. All packing rings 9 are of commercially available design and are called "Chevron Rings". They have elastically deformable lips on their outer and inner circumferences which increase their sealability with increased pressure differential.

The use of these commercially available and inexpensive packing rings allows for low cost seat ring replacement in case of wear. While the lowest packing ring serves as valve orifice, the upper rings prevent escape of fluid along the upper portion of valve plug 11.

The compression of packing rings 9 is accomplished by means of valve bonnet 18, the lower portion 19 of which is threadingly engaged with housing 1 and the lower terminating end 20 of which contacts packing rings 9. A recess 21 within the lower bonnet portion is cooperating with a metal washer 22, suitably fastened to the upper part of plug 11, to serve to limit the upward stroke of plug 11.

For any given inlet pressure, rotation of bonnet 18 by means of a hex portion 23 enables the valve assembler to compress packing ring 9 sufficiently to prevent leakage by plug 11. Such adjustment is possible even while the valve is in actual service as part of a piping system, thus enabling the user to compensate for minor wear of packing rings 9 due to severe operating conditions. The final location of bonnet 18 in respect to packing 9 is then fixed by means of a locknut 24.

As added safety feature, bonnet 18 may incorporate a conventional stuffingbox arrangement 25 primarily used to seal stem 17 in case of failure of packing 9.

With the plug 11 fully engaged in lower packing ring 9a, virtually bubble tight shut-off can be achieved, yet, upon retraction, flow rates ranging from a few bubbles or drops per minute to several gallons per hour can effectively be controlled depending on the selected shape or angle of plug contour 16. Such wide range of flow control is not possible with conventional corrosion resistant valves having typical plug and orifice configurations made either completely of Teflon or ceramics. The reason is that very fine flow control demands close clearance between the plug and seat ring in the order of few 1/10,000 of an inch. Such clearances are not only impossible to machine, particularly with plastic materials such as Teflon having a rather large coefficient of thermal expansion, but are also unworkable, since both mating pieces would immediately seize against each other caused by such tight fits, leading to a destruction of both mating parts.

While the invention has been described in light of an illustrated preferred embodiment, numerous changes may be made both in the design or in the selection of materials without departing from the scope of the following claims:

I claim:
1. Chemically inert control valve comprising
   (a) housing having a longitudinal central bore extending throughout its lengths;
   (b) inlet and outlet end formed on said housing, said inlet and out ends adapted to be coupled in a pipe line;
   (c) a cylindrical insert removeably received in said central bore;
   (d) a central perpendicular cross-bore intersects both said housing and said insert and containing within a tubular packing arrangement consisting of an upper and a lower portion, separated by tubular spacer means having one or more communicating passages between its inner and outer periphery;
   (e) a plug slidably engaged within said packing arrangement, one lower terminating end of said plug arranged to selectively engage or disengage the lower portion of said packing arrangement;
   (f) at least one lower horizontal co-passage within said cylindrical insert and located below the lower portion of said packing arrangement for communication of fluid towards the central perpendicular cross-bore;
   (g) one or more upper horizontal passages within said cylindrical insert and communicating with said passages in the tubular spacer means;
   (h) means to position said plug;
   (i) means to compress said packing arrangement.

2. Chemically inert control valve comprising according to claim 1, wherein said plug incorporates at its lower terminating end a reduced cross-sectional portion to affect the rate of fluid passing through said lower portion of said packing arrangement when retracted.

3. Chemically inert control valve comprising according to claim 1, wherein said insert extends in length beyond the housing to engage sealingly with said piping system.

4. Chemically inert control valve comprising according to claim 1, wherein means for compressing said packing arrangement comprise a bonnet having a central longitudinal bore and which is threadingly engaged within said housing.

5. Chemically inert control valve comprising according to claim 4, wherein said bonnet contains additional packing means.

6. Chemically inert control valve comprising according to claim 1, wherein said means for positioning said valve plug consists of a valve stem suitably fastened to the upper terminating end of said plug.

7. Chemically inert control valve comprising according to claim 6, wherein additional means for limiting valve stroke are incorporated between the valve stem and plug.

8. Chemically inert control valve comprising according to claim 4, wherein the lower terminating end of said bonnet having a recessed enlarged bore whose terminating end is spaced to retain the means for limiting valve travel incorporated between valve stem and plug.

* * * * *